Patented Oct. 15, 1929

1,731,299

UNITED STATES PATENT OFFICE

HENRY DREYFUS, OF LONDON, ENGLAND

TREATMENT OF CELLULOSE PRIOR TO ESTERIFICATION

No Drawing. Original application filed April 18, 1923, Serial No. 633,016, and in Great Britain May 24, 1922. Divided and this application filed January 16, 1926. Serial No. 81,838.

This application is a division of my prior application Serial No. 633,016 filed April 18, 1923.

The above application covers esterifying cellulose or its near conversion products with acetic or other fatty acid anhydride in presence of sulphuric acid or other strong condensing agent to produce a highly viscous product by means of using acetic acid or other solvent in quantity over six times the weight of the cellulose.

The subject matter of the present application relates to a preliminary treatment which may be given the cellulose or cellulose conversion products in order to render them more reactive to the esterification process while substantially preserving the strength of the cellulosic material. While cellulose or its conversion products which have been pre-treated according to the process hereinafter described and claimed are especially suitable for esterification according to the process disclosed and claimed in said parent application, nevertheless they may be esterified by other known or new processes of esterification.

While the pretreatment as hereinafter described is carried out by the use of acetic acid, nevertheless, it may be carried out by the use of other fatty acids, such as propionic, butyric, or formic acid.

To carry out the invention one can heat the cellulose or conversion product of cellulose with acetic acid alone.

Such a special pretreatment may also be carried out by treating the cellulose or cellulose conversion product by heating or boiling with concentrated or dilute acetic or other organic acid, such as formic acid, etc., preferably with the addition of small quantities of sodium acetate or other suitable neutralizing agent which is capable of neutralizing any traces of mineral acids that may be present, and which mineral acid would have a destructive effect upon the cellulose molecules during the hot treatment with organic acid. The cellulosic material may be treated hot with glacial or dilute acetic acid, preferably but not necessarily containing a small quantity of sodium acetate or other suitable neutralizing agent. The temperature and the length of the treatment will vary with the concentration of the acid and also with the particular acid used. For instance, with glacial acetic acid, at about 100° C. or at the boiling point of the acid, the treatment may last about one to six hours, more or less, and will be correspondingly longer at temperatures between about 80° and 100° C. Similarly, with more dilute acid, such as acetic acid of from 80% to 50% strength or less, the hot treatment will take correspondingly longer for a given temperature dependent upon the increased dilution of the acid. The temperature and length of treatment will also vary with the particular acid employed. If formic acid is used, although it may be employed in a concentrated form, this is less advantageous and it is better to use a more dilute acid of about 50% strength. This will effect the pretreatment more quickly even than a more concentrated acetic acid.

In any of the forms of pretreatment above described, the acetic or other organic fatty acid employed may be used in admixture with diluents which are not capable of entering into reaction with either the cellulose or the acid, such as toluol. This is found to be somewhat less advantageous.

The preheated material may be subjected directly to the esterifying reaction, but it is found preferable to wash and dry the same before subjecting it to esterification.

When cellulose or its conversion products are thus pretreated, the esterification process is carried out more quickly and it is possible to conduct and finish acetylation at temperatures as low as 0° C. or even lower. Of course since the esterification reaction with such pretreated material is much more effective, higher temperatures may be employed by using increased quantities of acetic acid or diluent in the esterification process.

Although of particular value in the production of cellulose acetate the pretreatment which forms the subject matter of the present invention is of value in the production of any of the fatty acid esters of cellulose. The invention is, therefore, to be regarded as limited only by the scope of the appended claims.

I claim:—

1. A process of treating cellulose, which comprises heating it with a lower fatty acid until the cellulose is highly reactive to esterification.

2. A process of treating cellulose, which comprises heating it with a lower fatty acid of 50% to 100% concentration until the cellulose is highly reactive to esterification.

3. A process of treating cellulose, which comprises heating it with a lower fatty acid of 80% to 100% concentration until the cellulose is highly reactive to esterification.

4. A process of treating cellulose, which comprises heating it with acetic acid until the cellulose is highly reactive to esterification.

5. A process of treating cellulose, which comprises treating it with acetic acid of 50% to 100% concentration until the cellulose is highly reactive to esterification.

6. A process of treating cellulose, which comprises heating it with acetic acid of 80% to 100% concentration until the cellulose is highly reactive to esterification.

7. A process of treating cellulose, which comprises heating it with acetic acid at temperatures from about 80° C. to the boiling point of the acid until the cellulose is highly reactive to esterification.

8. A process of treating cellulose, which comprises heating it with acetic acid of 50% to 100% concentration at temperatures from about 80° C. to the boiling point of the acid until the cellulose is highly reactive to esterification.

9. A process of treating cellulose, which comprises boiling it with acetic acid until the cellulose is highly reactive to esterification.

10. A process of treating cellulose, which comprises heating it with glacial acetic acid at from about 80° C. to the boiling point of the acid until the cellulose is highly reactive to esterification.

11. A process of treating cellulose, which comprises heating it for about one to six hours with glacial acetic acid at from about 100° C. to the boiling temperature, whereby it is rendered highly reactive to esterification.

12. A process of treating cellulose, which comprises subjecting it to the action of acetic acid containing a small quantity of a neutralizing agent, thereby rendering the cellulose capable of rapid esterification.

13. A process of treating cellulose, which comprises subjecting it to the action of acetic acid containing a small quantity of sodium acetate, thereby rendering the cellulose capable of rapid esterification.

14. A process of treating cellulose, which comprises subjecting it to the action of acetic acid of 50% to 100% concentration and containing a small quantity of sodium acetate, thereby rendering the cellulose capable of rapid esterification.

15. A process of treating cellulose, which comprises subjecting it to the action of acetic acid of 50% to 100% concentration and containing a small quantity of sodium acetate, at a temperature not exceeding the boiling point of the acid, thereby rendering the cellulose capable of rapid esterification.

In testimony whereof I have hereunto subscribed my name.

HENRY DREYFUS.